(12) United States Patent
Binkley et al.

(10) Patent No.: US 8,057,148 B2
(45) Date of Patent: Nov. 15, 2011

(54) ROOFING MATERIAL FASTENERS, APPLICATORS AND METHOD OF INSTALLATION

(75) Inventors: Jesse Alvin Binkley, Midlothian, TX (US); Jason L. Wolfe, Ennis, TX (US); Lou Hahn, Waxahachie, TX (US)

(73) Assignee: Building Materials Investment Corp., Wilmington, DE (US)

( * ) Notice: Subject to any disclaimer, the term of this patent is extended or adjusted under 35 U.S.C. 154(b) by 546 days.

(21) Appl. No.: 12/188,837

(22) Filed: Aug. 8, 2008

(65) Prior Publication Data

US 2009/0047099 A1    Feb. 19, 2009

Related U.S. Application Data

(60) Provisional application No. 60/956,526, filed on Aug. 17, 2007.

(51) Int. Cl.
  *F16B 15/00*  (2006.01)
  *E04D 1/34*  (2006.01)
(52) U.S. Cl. .......................................... 411/458; 52/543
(58) Field of Classification Search .................. 411/388, 411/457, 458, 481, 921; 52/543
  See application file for complete search history.

(56) References Cited

U.S. PATENT DOCUMENTS

| | | | | |
|---|---|---|---|---|
| 847,888 A | * | 3/1907 | Birdsall | 411/459 |
| 1,397,848 A | * | 11/1921 | Wood et al. | 403/247 |
| 1,699,421 A | * | 1/1929 | Bean | 411/481 |
| 1,710,891 A | * | 4/1929 | O'Hare | 411/458 |
| 1,810,808 A | | 7/1929 | Yost | |
| 2,048,234 A | * | 7/1936 | Tucker | 52/513 |
| 2,570,626 A | | 3/1947 | Abraham | 108/33 |
| 2,660,137 A | * | 11/1953 | Abraham | 52/543 |
| 3,693,496 A | * | 9/1972 | Koide | 411/458 |

(Continued)

FOREIGN PATENT DOCUMENTS

EP    1 172 498 A2    1/2002

OTHER PUBLICATIONS

PCT Notification of Transmittal of The International Search Report and The Written Opinion of The International Searching Authority, or The Declaration (Form PCT/ISA/220); PCT International Search Report (Form PCT/ISA/210); PCT Written Opinion of The International Searching Authority (Form PCT/ISA/237), regarding International Appln. PCT/US 08/73117, Nov. 2008.

*Primary Examiner* — Flemming Saether
(74) *Attorney, Agent, or Firm* — Fitzpatrick, Cella, Harper & Scinto

(57) ABSTRACT

A roofing material fastener comprises a shank having a length dimension and a point. The shank is adapted to enable it to be driven through at least a first course of roofing material and into a roof deck. A fastener head is positioned in a region of the shank distal from the point. A spike protrusion projects from the distal region of the shank to a terminus. The length of the spike protrusion is less than one half the length of the shank, measured from the point to the fastener head. The spike protrusion is adapted to penetrate a depth less than the full depth of a second course of roofing material installed above the first course. The spike protrusion is shaped to inhibit sawing through the second course of roofing material by the spike protrusion.

2 Claims, 8 Drawing Sheets

U.S. PATENT DOCUMENTS

| | | | |
|---|---|---|---|
| 4,164,971 A | 8/1979 | Strand | 151/14.5 |
| 4,305,541 A | 12/1981 | Barrett et al. | 227/120 |
| 4,779,393 A | 10/1988 | Jong | 52/585 |
| 5,165,588 A | 11/1992 | Rowland | 227/147 |
| D351,335 S | 10/1994 | Yazich | D8/389 |
| 5,433,043 A * | 7/1995 | Hibbitt et al. | 52/27 |
| 5,709,332 A | 1/1998 | Coop | 227/66 |
| 5,743,693 A | 4/1998 | Sobotker, Jr. | 411/460 |
| 5,778,623 A | 7/1998 | Powell | 52/410 |
| 6,102,642 A | 8/2000 | Kawashita et al. | 411/401 |
| 6,679,668 B2 | 1/2004 | Martin et al. | 411/388 |
| 7,293,684 B1 | 11/2007 | Wen | 227/130 |
| 2004/0234331 A1 | 11/2004 | Fenton | 403/286 |

* cited by examiner

ROOFING MATERIAL FASTENERS, APPLICATORS AND METHOD OF INSTALLATION

BACKGROUND OF THE INVENTION

Field of the Invention

The present invention relates to roofing material fasteners, applicators for installing roofing materials, and in particular laminated roofing shingles, and a method of installing such materials on roofs.

FIG. 1 illustrates a laminated roofing shingle 10 that includes a top sheet of roofing material 11 and a bottom sheet 12 held together by an adhesive applied at the time of manufacture. The top sheet 11 includes headlap portion 13 and buttlap portion 14. See, FIG. 2. The buttlap portion 14 features dragon teeth 15 between which the bottom sheet 12, also known as a backer strip or shim, is visible.

Roofing shingle 10 is typically fastened to a roof by driving several standard roofing nails through the common bond portion 16 of the shingle. The common bond area 16 is the laminated portion of the shingle above the open spaces 17 between dragon teeth 15. During shingle installations, roofers often fail to drive nails through the common bond area by nailing above that area such that the nail penetrates the headlap portion 13 of the shingle but not the backer strip or shim 12. This results in the backer strip not being securely held in place against future movement. This is especially troublesome in warm climates where the backer strip can move down over time and actually be visible.

SUMMARY OF THE INVENTION

The invention is directed to roofing material fasteners that include spikes on their heads that become embedded in overlying roofing material, such as a shingle, which is installed in a subsequent course of roof coverage. The invention is also directed to applicator devices capable of driving such spiked roofing material fasteners through roofing shingles and other roofing material, and to a method for installing roofing material.

In one embodiment, the fastener comprises a shank element having a length dimension and a point. The shank is adapted to enable it to be driven through at least a first course of roofing material and into a roof deck and may be a screw. A fastener head is positioned in a region of the shank element distal from the point. A spike protrusion projects from the distal region of the shank to a terminus. The length of the spike protrusion is less than one half the length of the shank element, measured from the point to the fastener head. The spike protrusion is adapted to penetrate a depth less than full depth of a second course of roofing material installed above the first course. The spike protrusion is shaped to inhibit sawing through the second course of roofing material by the spike protrusion.

In another embodiment, the roofing material fastener also comprises a shank element having a length dimension and a point and the shank element is adapted to be driven through at least a first course of roofing material and into a roof deck, but the shank element of the fastener is selected from the group consisting of nails and staples. The fastener further comprises a fastener head disk element including at least one spike protrusion. The shank element passes through a central region of the disk element to attach the disk element to the shank element distal from the point. The length of the at least one spike protrusion is less than one half the length of the shank element, measured from the point to the fastener head. The spike protrusion is also adapted to penetrate a depth less than the full depth of a second course of roofing material installed above the first course; and the spike protrusion is shaped to inhibit sawing through the second course of roofing material by the spike protrusion.

The invention also relates to a method for installing at least a first course of laminated roofing shingles and a second course of laminated roofing shingles on a roof deck. The shingles include a top sheet and a backer strip. The method comprises driving a fastener through a headlap portion of the top sheet of the first course of laminated roofing shingles, above a common bond portion of the shingles and into the roof deck. The fastener is as described in prior paragraphs 0005 and 0006 and includes fastener shank elements selected from the group consisting of nails, screws and staples. The method also includes installing the second course of laminated roofing shingles above the first course, wherein the spike protrusion of the fastener penetrates into the backer strip of the second course to a depth less than the full depth of the backer strip.

BRIEF DESCRIPTION OF THE DRAWINGS

For a more complete understanding of the present invention and the advantages thereof, reference is made to the following descriptions, taken in conjunction with the accompanying drawings, in which.

DETAILED DESCRIPTION OF THE INVENTION

Figure 1:
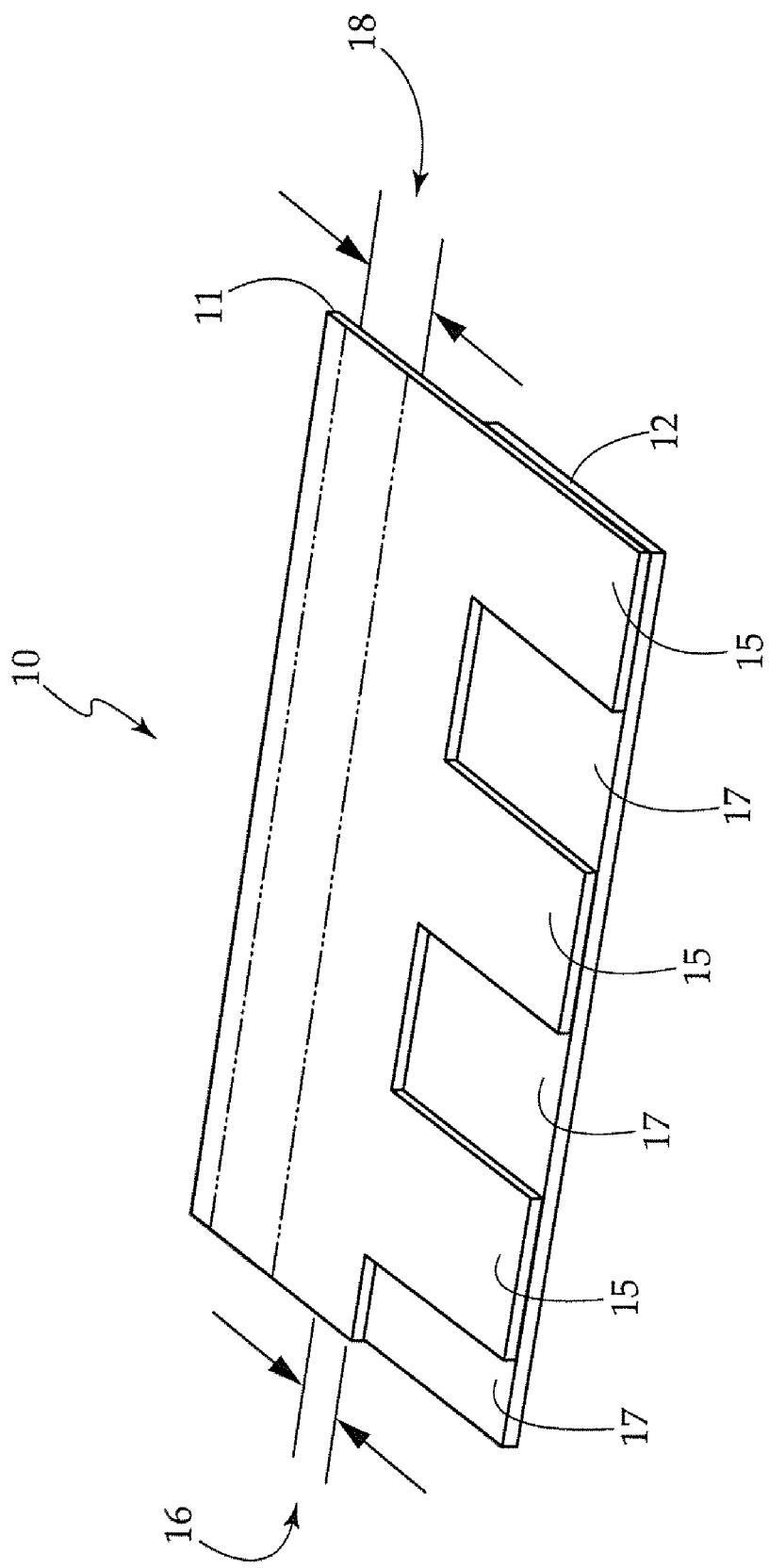
FIG. 1 is a perspective view of a single laminated roofing shingle illustrating standard common bond fastener zone 16 and new fastener zone 18 facilitated by the present invention.
Figure 2:
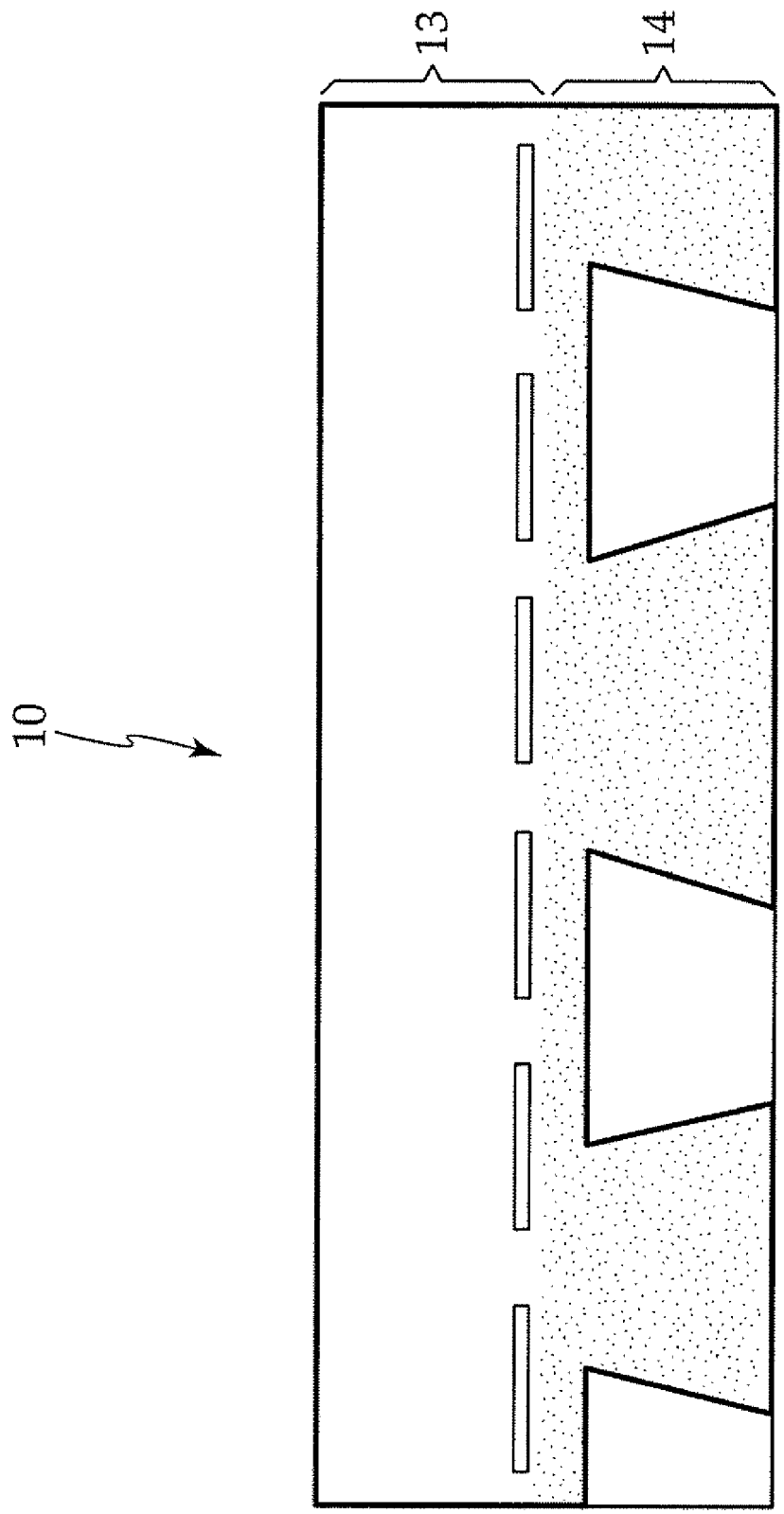
FIG. 2 is a top plan view of a prior art laminated shingle illustrating the headlap 13 and buttlap 14 shingle portions.

The present invention includes fasteners 20 that comprise a shank element 21 having a length dimension and a point 22. The shank element is adapted to enable it to be driven through at least a first course of roofing material 13 and into a roof deck 30. A fastener head 23 is positioned in a region of the shank element distal from the point 22. A spike protrusion 24 projects from the distal region of the shank to a terminus 25. The length l of the spike protrusion 24 is less than one half the length (2l+x) of the shank element 21 measured from the point 22 to the fastener head 23.

The spike protrusion 24 is adapted to penetrate a depth less than the full depth of a second course of roofing material installed above the first course. The spike protrusion 24 is shaped to inhibit sawing through the second course of roofing material by the spike protrusion. The spike terminus 25 is preferably pyramid shaped, not needle shaped. The terminus is sufficiently sharp to enable the spike to penetrate the material of the second course.

The length l of the spike protrusion 24 is preferably from about 0.030 in. to about 0.070 in. The diameter of the spike protrusion is preferably from about 0.015 in. to about 0.135 in. As illustrated in FIGS. 5A, 5B, 5C and 5D, the roofing material fastener 20 may be adapted to further inhibit the spike protrusion 24 from sawing through the second course of roofing material. In that regard the fastener head 23 has a top surface including at least one element selected from the group consisting of a tubular rim 26 an annular rim 27 a raised edge 28 and a shaped ridge 29.

Figure 4:
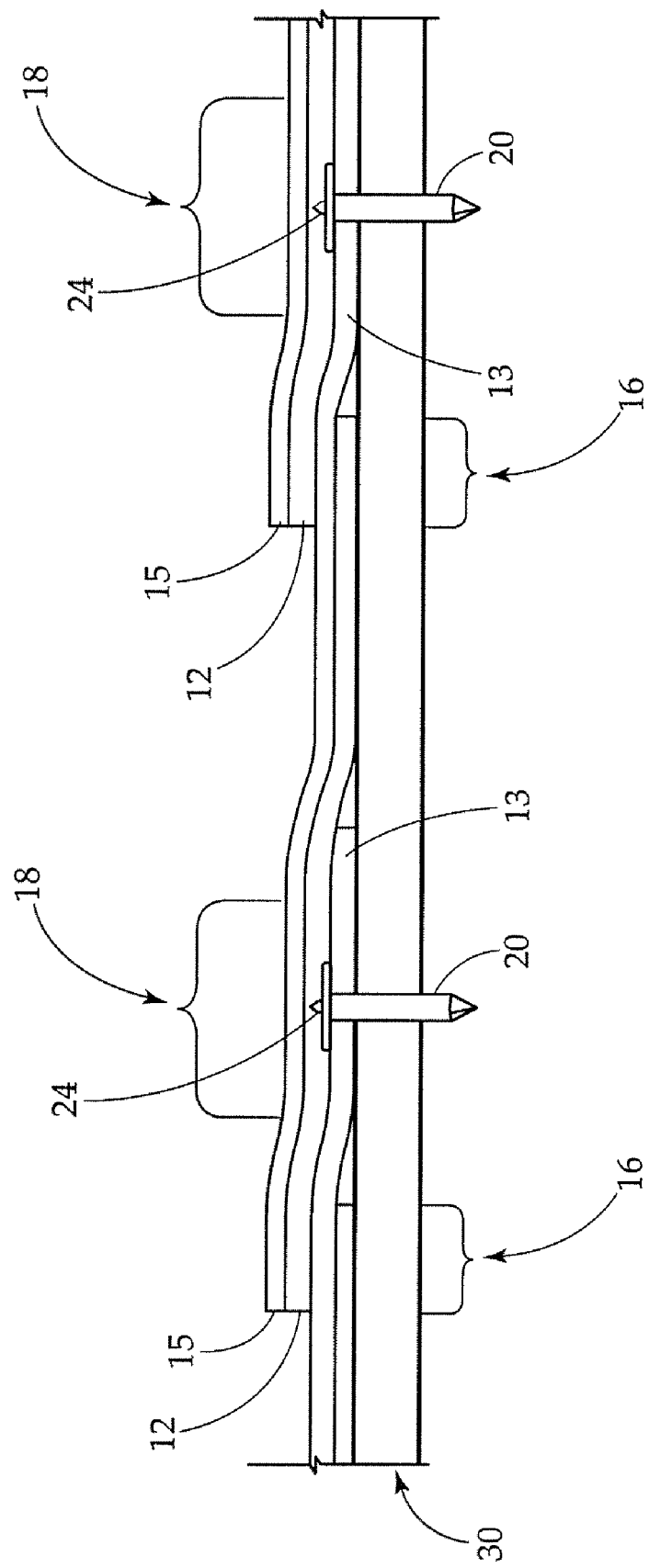
FIG. 4 is a side view of installed laminated roofing shingles illustrating fastener zones 16 which would have been utilized had prior art roofing fasteners been employed and new fastener zones 18 utilized when the spiked roofing fasteners 20 of the present invention are used to install such shingles.
Figure 5A:
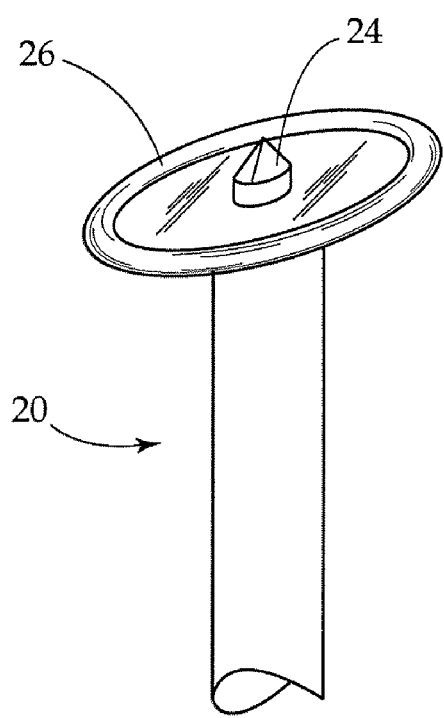
FIGS. 5A-D are side views of a spiked roofing material fastener 20 comprising a fastener head having (A) a tubular rim 26; (B) an annular rim 27; (C) a raised edge 28; and (D) a shaped ridge 29.
Figure 5B:
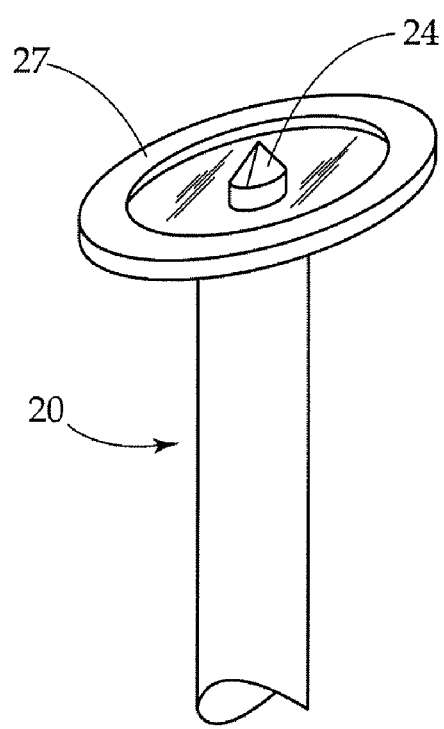
Figure 5C:
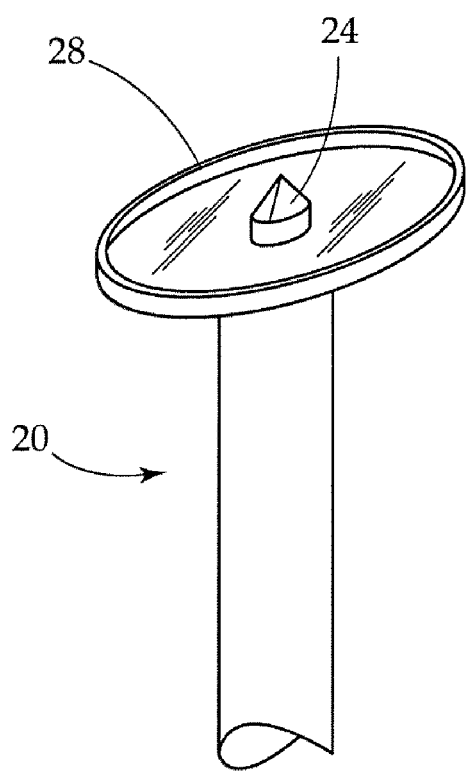
Figure 5D:
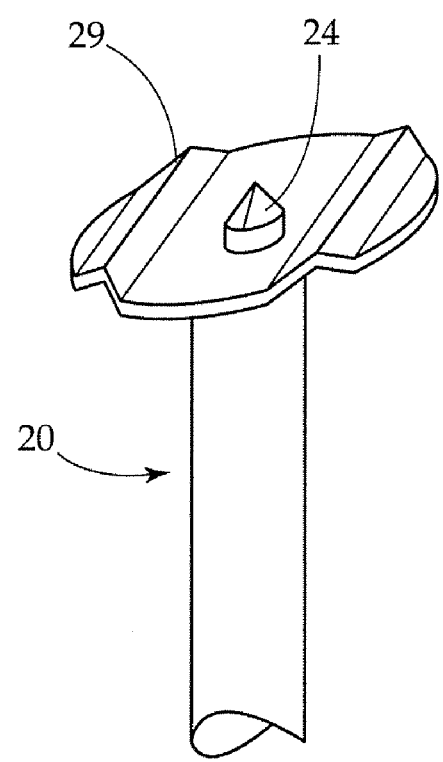

As illustrated in FIG. 4, when such roofing fasteners are used to install on a roof 30 a first course of laminated roofing shingles 10 by driving the fasteners 20 through the headlaps 13 of those shingles, the backer strip portions or shims 12 of a second course of overlaying shingles are impaled on the spikes 24 protruding from the fasteners used to install the first course, such that undesirable, subsequent movement of the backer strips of the second course of laminated shingles is inhibited. When the second course is laid in place, ordinary palm pressure readily embeds the spikes of the previously installed fasteners in the backer strip of the shingle. Kneeling and walking on the shingles also facilitates spike emplacement.

The spike protrusions 24 on the roofing fasteners 20 of the present invention may be formed, for example, by wire drawing, extrusion, forging, hammering or casting of the body of the fastener about a preformed spike. Such fasteners preferably include, but are not limited to, roofing nails. Alternatively, the inventive fasteners may be formed by drilling or otherwise creating holes in manufactured fasteners and subsequently inserting spikes in the holes.

The spike protrusions are of sufficient length l to penetrate roofing shingle fabric, in particular the shims or backer strips of laminated shingles, to a depth that ensures penetration of the reinforcing mat within such shingles. The spikes are also of sufficient width or diameter d to inhibit sawing or knifing through the shingle components by the spike protrusion.

The roofing material fasteners of the present invention may be driven by hammers, roofer hatchets, and other applicator driving devices having heads modified with leather, wood, rubber, plastic, natural or man-made fabric, composite, serrated, grooved or checkered facing designed so as to not damage the spike protrusions on impact. The facing may be permanent or replaceable.

The fasteners of the present invention have at least one spike protrusion that may be centrally located on the head or positioned peripherally, such as may occur with an upturned rim or barb formed from the rim of a nail, or located anywhere between the central axis of the fastener and the perimeter of the head.

The spike protrusions may be of any shape and may be circular in cross section. In one embodiment, the spikes are tapered. The ends of the spikes may be pointed, flat, rounded or have an irregular shape.

To further decrease the risk of the spike knifing or sawing through the fabric of the overlying shim, the fastener head may have a tubular or annular rim or a raised edge about its perimeter. Shaped ridges having X, T, V, S, Y or other configurations across the top of the head of the fastener may also achieve the result of providing a multidirectional configuration that resists shim movement.

Figure 3A:
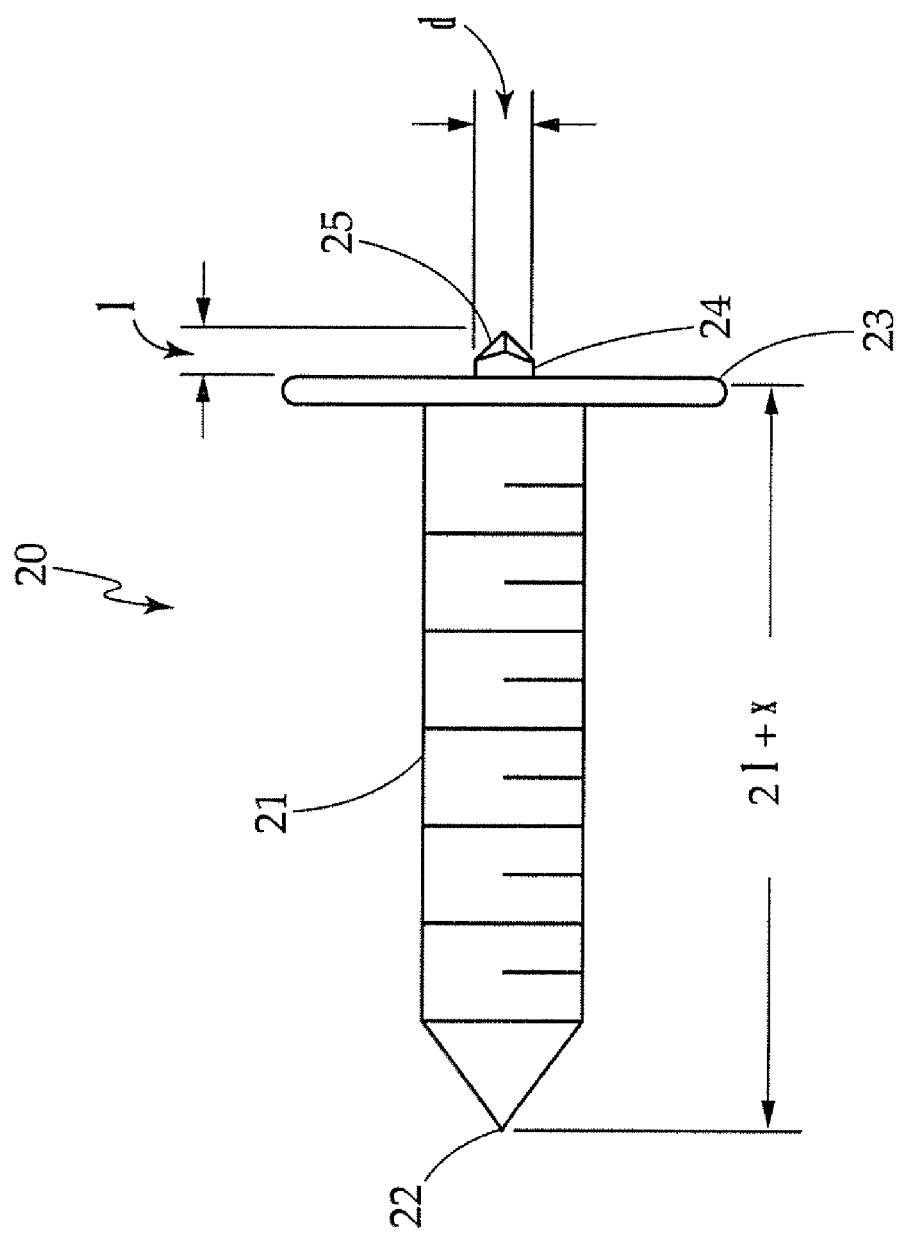
FIGS. 3A-C are side views of a spiked roofing material fastener 20 of the present invention comprising a shank element 21 which comprises (A) a screw; (B) a nail; and (C) a staple.
Figure 3B:
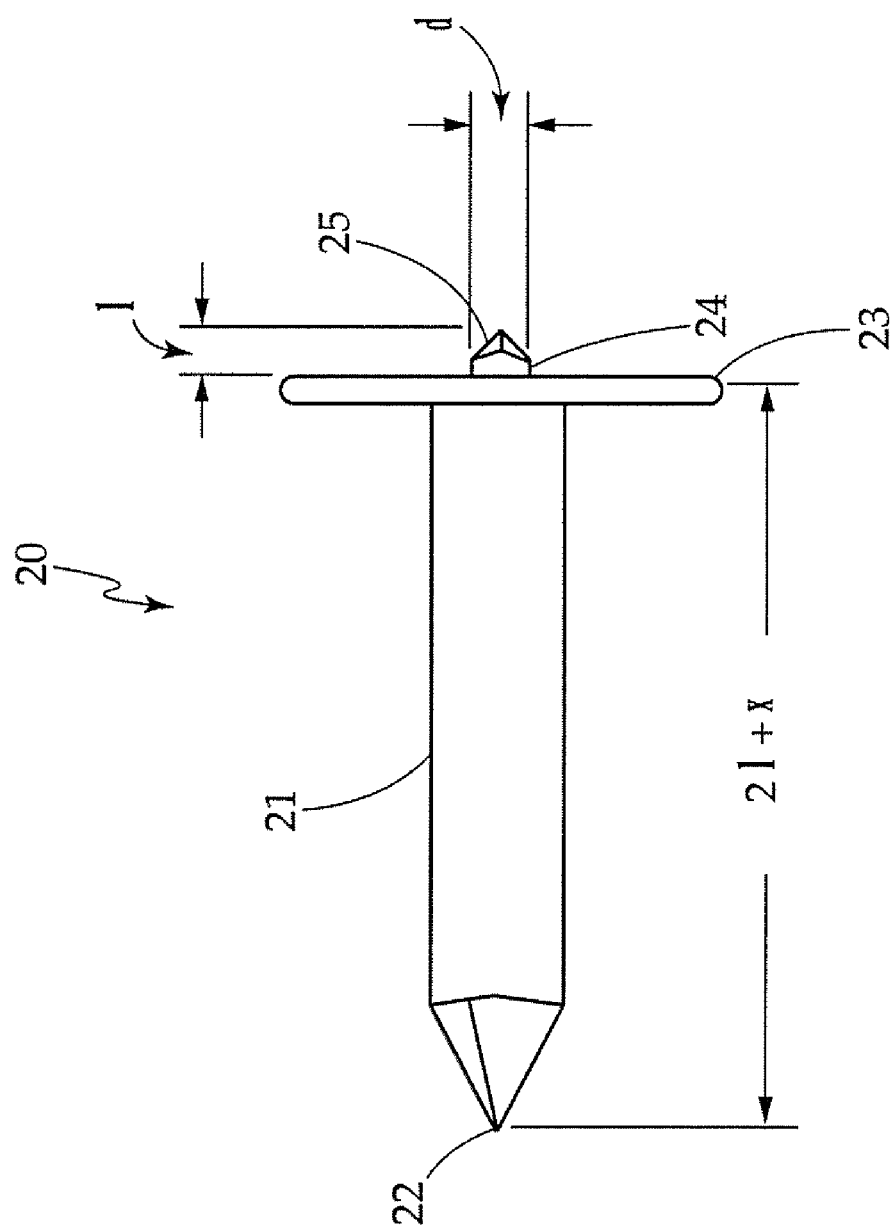
Figure 3C:
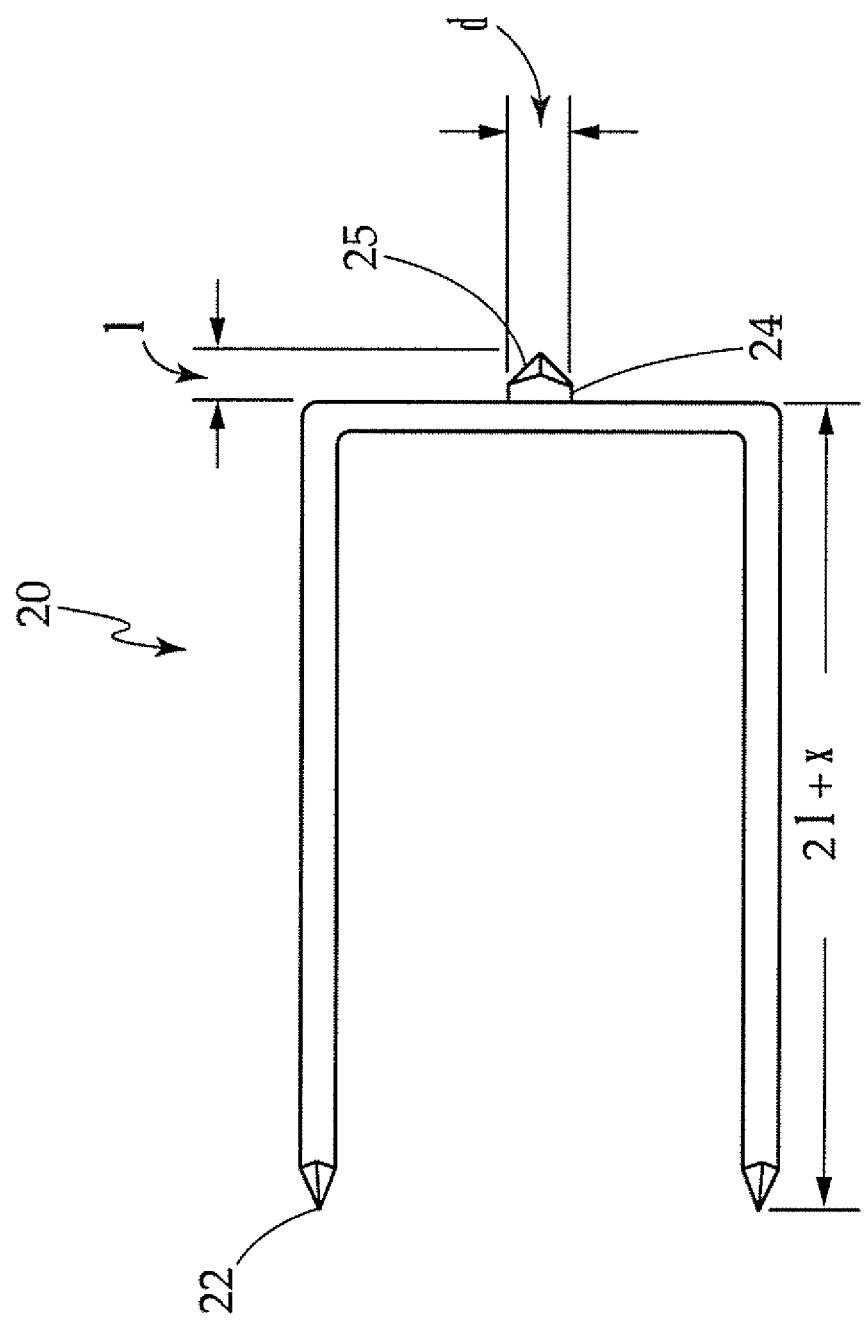

As illustrated in FIGS. 3A, 3B and 3C, in another embodiment, the roofing material fastener of the present invention comprises a shank element selected from the group consisting of standard screws, nails and staples. The shank element has a length dimension and a point and is adapted to be driven through at least a first course of roofing material and into a roof deck. The fastener also includes a fastener head disk element having at least one spike protrusion. The shank element may pass through a central region of the disk element to attach the disk element to the shank element distal from the point. The length of the at least one spike protrusion is less than one half the length of the shank element, measured from the point to the fastener head. The spike protrusion is adapted to penetrate a depth less than the full depth of a second course of roofing material installed above the first course. The spike protrusion is shaped to inhibit sawing through the second course of roofing material by the spike protrusion. In some embodiments, at least a portion of the disk element is upturned (e.g., with rims, barbs or ears) and thereby adapted to further inhibit the spike protrusion from passing through the second course of roofing material.

The spike protrusion may be an integral component of the disk element or it may be attached to the disk element by various means which include, but are not limited to, mechanical fastening, brazing, soldering, welding and gluing. Washers or discs may be used with nails or other driven elements passing through their centers, or they may be adhered or fastened to the tops of the nails or other driven elements.

The spiked fasteners of the present invention include staples having upturned barbs, or legs and screws having upturned barbs, fins, blades, burs or other protrusions. Spiked fastener nails and staples of the present invention may be formed by casting, wire drawing, extrusion, stamping, forging, fusing, welding, brazing, soldering, gluing or otherwise fastening multiple components together or bending single pieces of fastener material.

The spike protrusions on the fasteners of the present invention may be coated with a hydrophobic material, such as an oil or grease, that performs a sealant function if water leaks due to the spike penetrating into the shim or other roofing material element. The coatings may be asphaltic materials, rubber modified asphalts, silicones, tree resins and derivatives, etc. The sealant may be applied during the manufacture of the spiked fasteners or subsequent thereto, such as at the job site.

A further embodiment of the invention features coating at least a portion of the fastener head, including the spike protrusion, with an adhesive to inhibit the shim or other roofing material from lifting off the spike and slipping down on the roof. Suitable adhesives have high tack and high activation temperatures and include rubber modified asphalts.

The present invention permits utilization of a new overall nailing zone 18 which is approximately 2 in. wide and is located sufficiently above the shim 12 to prevent damage to the shingle fabric just above the common bond area 16. Employment of the present invention permits a reduction in the width of the common bond area because the laminating adhesive is not required to support the entire weight of the shim.

The invention also includes a method for installing at least a first course of laminated roofing shingles and a second course of laminated roofing shingles on a roof deck 30. The shingles include a top sheet 11 and a backer strip 12. The method comprises driving a fastener 20 through a headlap portion 13 of the top sheet of the first course of laminated roofing shingles, above a common bond portion 16 of the shingles (e.g. in fastener zone 18) and into the roof deck. Alternatively, the fastener may be driven through the common bond portion of the shingles. The fastener comprises a shank having a length dimension and a point. The shank is adapted to enable it to be driven through at least the first course of roofing shingles and into a roof. A fastener head is positioned in a region of the shank distal from the point. A spike protrusion projects from the distal region of the shank to a terminus. The length the spike protrusion is less than one half the length of the shank element, measured from the point to the fastener head. The spike protrusion is adapted to penetrate a depth less than the full depth of the second course of roofing shingles installed above the first course. In accordance with the method, the second course of laminated roofing shingles is installed above the first course. The spike protrusion of the fastener penetrates into the backer strip of the second course to a depth less than the full depth of the backer strip.

The invention further includes an alternative method for installing laminated roofing shingles on a roof deck. In the alternative method, the roofing material fastener described in paragraphs 0007 and 0025 above are employed in the method steps described in paragraph 0031.

The fasteners of the present invention may be driven by a pneumatic, cartridge fired, electrical or impact/mechanical applicator device having a head designed to facilitate use of the "spiked" fasteners. Such head design features include holes, dimples, channels, grooves, notches or other applicator head, face and feed modifications that enable passage of the spiked fastener without damage to the spike protrusions thereof. That may be accomplished by including a small V or U shaped notch in the concave face of the driver or impact head of the applicator. Additionally or alternatively, fasteners having uniformed shaped spike protrusions, e.g. turned up edges in only one position, may be oriented in a collated strip or belt of fasteners so that all spikes are always at a fixed location with respect to the driving head. Utilization of such fasteners may simplify or eliminate fastener gun driver head modification by the fastener gun manufacturer or after market user.

In one embodiment, an Hitachi NV45AB2 pneumatic coil nail gun was modified by cutting a clearance channel in the driver blade or head of the nailer to permit clearance of spiked nails. Grip Rite 1.5 in. coil or collated nails had been modified to include a spike. The modified gun was loaded with the spiked nails, and it operated without incident, firing the spiked nails into a plywood sample.

Alternatively, the applicator device may have internal components designed to upturn, tear, dog-ear or otherwise modify fasteners, such as roofing nails, in a manner to produce spiked roofing fasteners.

It should be understood that the above embodiments are illustrative, and that fasteners, applicator devices and methods of installation other than those described herein can be employed while utilizing the principles underlying the present invention.

What is claimed is:

1. A roofing material fastener comprising:
   (a) a shank element having a length dimension and a point, said shank element being adapted to enable it to be driven through at least a first course of roofing material and into a roof deck;
   (b) a fastener head positioned in a region of the shank element distal from said point; and
   (c) a spike protrusion projecting from said region of the shank element to a terminus; said spike protrusion having a length less than one half the length of the shank, measured from the point to the fastener head;
   wherein the spike protrusion is adapted to penetrate a depth less than the full depth of a second course of roofing material installed above said first course;
   wherein the spike protrusion is shaped to inhibit sawing through said second course of roofing material by said spike protrusion; and
   wherein the length of the spike protrusion is from about 0.030 in. to about 0.070 in.

2. The roofing material fastener according to claim 1 wherein the diameter of the spike protrusion is from about 0.015 in. to about 0.135 in.

* * * * *